Jan. 28, 1930. J. B. WARD 1,744,996
DISPLAY STAND
Filed Sept. 15, 1928
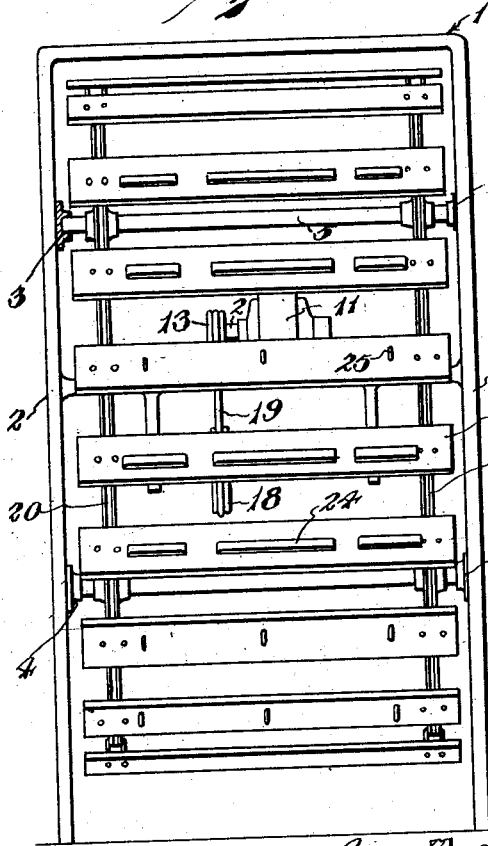
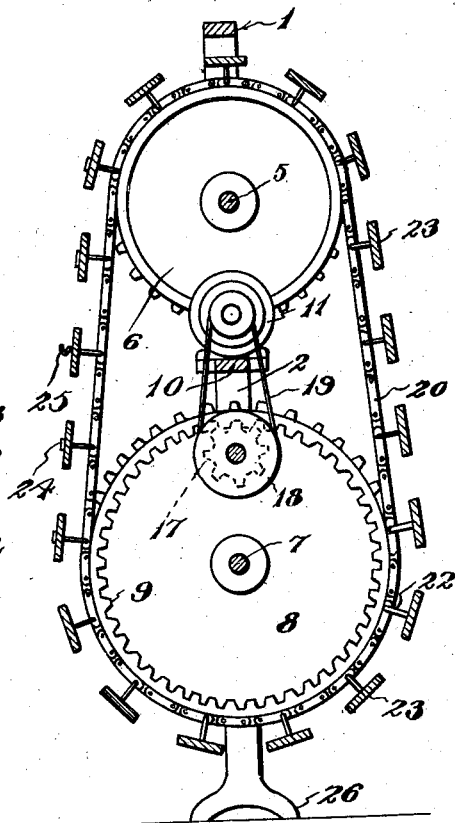
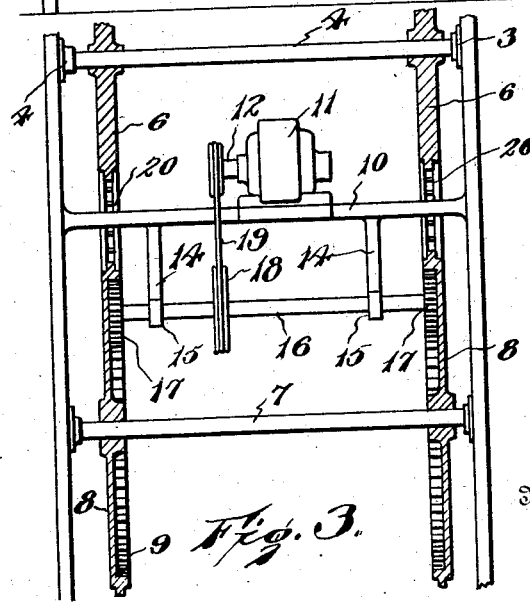
Inventor
J. B. Ward
By Lacey & Lacey, Attorneys Patented Jan. 28, 1930

1,744,996

UNITED STATES PATENT OFFICE

JOHN B. WARD, OF BRAY, CALIFORNIA

DISPLAY STAND

Application filed September 15, 1928. Serial No. 306,105.

The present invention is directed to improvements in display stands.

The primary object of the invention is to provide a device of this character so constructed that the goods upon the stand will be continuously moved, thereby not only displaying the goods to an advantage, but will attract attention to the stand.

Another object of the invention is to provide a device of this character including a frame for supporting the strips upon which the goods are secured, means being provided to mount a motor for driving the display strips in a vertical direction in order that the goods will be successively displayed.

Another object of the invention is to provide a display stand which is simple in construction, attractive in appearance, and one which can be manufactured at a small cost.

With these and other objects in view, this invention resides in the novel features of construction, formation, combination and arrangement of parts to be hereinafter more fully described, claimed and illustrated in the accompanying drawing, in which:—

Figure 1 is a front view thereof.

Figure 2 is a vertical central sectional view through the stand.

Figure 3 is a detail cross sectional view.

Figure 4 is a detail perspective showing the manner in which the strips are secured to the stand.

Referring to the drawing, 1 designates an inverted U-shaped frame formed from suitable metal, the side arms 2 thereof having upper and lower diametrically opposed bearings 3 and 4, respectively.

Journaled in the bearings 3, are the ends of the shaft 5, said shaft having engaged thereon sprocket wheels 6—6, the purpose of which will appear later.

A shaft 7 is provided and has its ends journaled in the bearings 4 and engaged upon said shaft are sprocket wheels 8—8, which are greater in diameter than the wheels 6—6. The sprocket wheels 8—8 are provided with internal teeth 9—9 the purpose of which will later be explained.

Having its ends secured to the side bars 2 is a bar 10 upon which is mounted an electric motor 11. The shaft 12 of the motor has fixed thereto a pulley 13, and depending from the bar 10 are spaced hangers 14 provided with bearings 15 for rotatably supporting the shaft 16. To the ends of the shaft 16 are fixed pinions 17 adapted to mesh with the internal teeth 9 of the sprocket wheels 8—8. The shaft 16 also has fixed thereto a pulley 18 which is alined with the pulley 13, there being a driving belt 19 trained around said pulleys imparting rotary movement to the shaft 16 when the motor is in operation.

Trained around the sprocket wheels 6—6 and 8—8 are endless sprocket chains 20—20, certain links 21 being pivotally connected by the bight portions of the U-bolts 22 to which are secured the ends of the transversely disposed strips 23, which may be formed from wood or sheet metal as desired.

The U-bolts are fixed in one of the links to prevent swinging thereof as they travel with the chains 20—20. These strips may be provided with elastic webs 24 or with hooks or clasps 25 in order that articles of various kinds can be secured to the strips for display during travel of the chains.

The lower ends of the bars 2 are provided with legs 26 to support the frame 1 in an upright position.

It will be apparent that when the belt 19 is driven rotary motion will be transmitted to the shaft 16 to drive the pinions 17, and thus the sprocket wheels 8—8 and 6—6 in order that rotary movement will be transmitted to the chains to successively move the strips.

From the foregoing, it is thought that the construction, operation and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

A display stand comprising a frame, upper and lower shafts journaled in the frame, sprocket wheels on the shafts, chains trained around the sprocket wheels, U-bolts connecting certain links of the chains, article holding strips having their ends extended beyond the chains and fixed to the arms of the U-bolts, whereby the ends of the strips are sustained spaced from the chains, and means for imparting rotary movement to the wheels, and thus the chain.

In testimony whereof I affix my signature.

JOHN B. WARD. [L. S.]